United States Patent
Lawrence et al.

(10) Patent No.: US 6,454,404 B1
(45) Date of Patent: Sep. 24, 2002

(54) INK JET PRINTING METHOD

(75) Inventors: Kristine B. Lawrence, Rochester; David M. Teegarden, Pittsford, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/770,128

(22) Filed: Jan. 26, 2001

(51) Int. Cl.$^7$ ................................................ G01D 11/00
(52) U.S. Cl. ........................ 347/100; 347/105; 428/195
(58) Field of Search .................................. 347/100, 101, 347/96, 105; 428/195

(56) References Cited

U.S. PATENT DOCUMENTS 3,687,929 A * 8/1972 Ramanathan et al. ....... 534/606
5,696,182 A * 12/1997 Kashiwazaki et al. ...... 347/100
5,942,335 A * 8/1999 Chen et al. ................. 347/105
6,045,917 A 4/2000 Missell et al.

* cited by examiner

*Primary Examiner*—John Barlow
*Assistant Examiner*—Manish S. Shah
(74) *Attorney, Agent, or Firm*—Harold E. Cole

(57) ABSTRACT

An inkjet printing method, including comprising the steps of:
A) providing an ink jet printer that is responsive to digital data signals;
B) loading the printer with ink-receptive elements including comprising a support having thereon an image-receiving layer including comprising a cationic, water-dispersible, partially quaternized pyridine-containing polymer;
C) loading the printer with an ink jet ink composition including comprising water, a humectant, and a water soluble anionic dye; and
D) printing on said image-receiving layer using said ink jet ink in response to said digital data signals.

15 Claims, No Drawings

INK JET PRINTING METHOD

CROSS REFERENCE TO RELATED APPLICATIONS

Reference is made to commonly assigned, U.S. Patent Applications:

Ser. No. 09/770,814 by Bermel et al., filed Jan. 26, 2001 entitled "Ink Jet Recording Element";

Ser. No. 09/771,191 by Bermel et al., filed Jan. 26, 2001 entitled "Ink Jet Recording Element";

Ser. No. 09/770,429 by Bermel et al., filed Jan. 26, 2001 entitled "Ink Jet Recording Element";

Ser. No. 09/770,782 by Bermel et al., filed Jan. 26, 2001 entitled "Ink Jet Recording Element";

Ser. No. 09/771,189 by Bermel et al., filed Jan. 26, 2001 entitled "Ink Jet Printing Method";

Ser. No. 09/770,433 by Bermel et al., filed Jan. 26, 2001 entitled "Ink Jet Printing Method";

Ser. No. 09/770,807 by Bermel et al., filed Jan. 26, 2001 entitled "Ink Jet Printing Method";

Ser. No. 09/770,728 by Bermel et al., filed Jan. 26, 2001 entitled "Ink Jet Printing Method";

Ser. No. 09/770,128 by Lawrence et al., filed Jan. 26, 2001 entitled "Ink Jet Printing Method";

Ser. No. 09/770,781 by Lawrence et al., filed Jan. 26, 2001 entitled "Ink Jet Printing Method";

Ser. No. 09/771,251 by Lawrence et al., filed Jan. 26, 2001 entitled "Ink Jet Printing Method";

Ser. No. 09/770,122 by Lawrence et al., filed Jan. 26, 2001 entitled "Ink Jet Printing Method";

Ser. No. 09/772,097 by Lawrence et al., filed Jan. 26, 2001 entitled "Ink Jet Printing Method"; and Ser. No. 09/770,431 by Lawrence et al., filed Jan. 26, 2001 entitled "Ink Jet Printing Method",

FIELD OF THE INVENTION

This invention relates to an inkjet printing process for improving the light stability and waterfastness of a printed image containing an inkjet ink containing a water-soluble anionic dye and a cationic receiver.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer which swells to absorb the ink or a porous layer which imbibes the ink via capillary action.

Ink jet prints, prepared by printing onto ink jet recording elements, are subject to environmental degradation. They are especially vulnerable to water smearing, dye bleeding, coalescence and light fade. For example, since inkjet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade.

U.S. Pat. No. 5,942,335 discloses an ink jet recording sheet comprising a support carrying an ink-receiving layer comprising a hydrophilic polymer and a polyvinylpyridine. However, there is a problem with this recording sheet in that images formed in the image-receiving layer have poor waterfastness.

U.S. Pat. No. 6,045,917 relates to the use of poly(N-vinyl benzyl-N, N, N-trimethyl ammonium chloride-co-ethyleneglycol dimethacrylate) particles in an ink jet image-recording layer. However, there is a problem with these particles in that images formed in the image-receiving layer have poor light stability, as will be shown hereafter.

It is an object of this invention to provide an inkjet printing method using anionic dyes suitable for use in aqueous inks for inkjet printing that will provide images with better light stability and waterfastness using certain receiver elements.

SUMMARY OF THE INVENTION

This and other objects are achieved in accordance with this invention which relates to an ink jet printing method, comprising the steps of:

A) providing an ink jet printer that is responsive to digital data signals;

B) loading the printer with ink-receptive elements comprising a support having thereon an image-receiving layer comprising a cationic, water-dispersible, partially quaternized pyridine-containing polymer, C) loading the printer with an inkjet ink composition comprising water, a humectant, and a water soluble anionic dye; and D) printing on the image receiving layer using the ink jet ink in response to the digital data signals.

It has been found that use of the above dyes and image-receiving layer provides excellent light stability and waterfastness.

DETAILED DESCRIPTION OF THE INVENTION

Any anionic, water-soluble dye may be used in composition employed in the method of the invention such as a dye having an anionic group, e.g., a sulfo group or a carboxylic group. The anionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the anionic, water-soluble dye which may be used in the composition employed in the method of the invention is a metallized azo dye, a non-metallized azo dye, a xanthene dye, a metallophthalocyanine dye or a sulfur dye. Mixtures of these dyes may also be used. An example of an anionic dye which may be used in the invention is as follows:

Dye 1

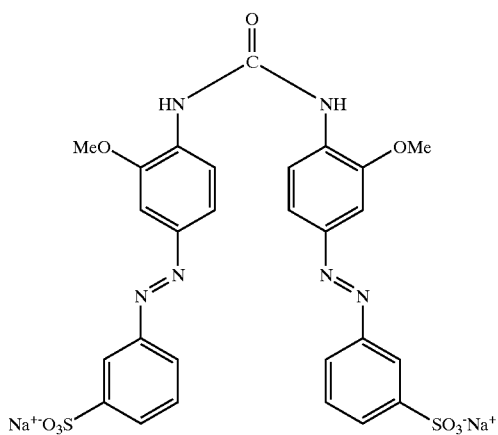

(Me is methyl)
Intrajet Yellow DG®
(Crompton and Knowles)

Dye 2

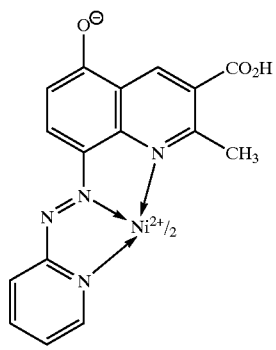

The dyes described above may be employed in any amount effective for the intended purpose. In general, good results have been obtained when the dye is present in an amount of from about 0.2 to about 5% by weight of the ink jet ink composition, preferably from about 0.3 to about 3% by weight. Dye mixtures may also be used.

In a preferred embodiment of the invention, the cationic, water-dispersible, partially quaternized pyridine-containing polymer has the formula:

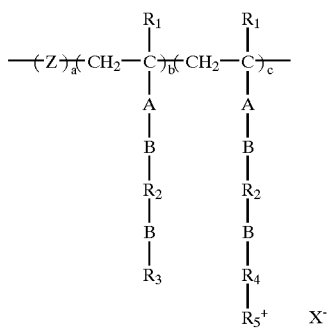

wherein:

each A independently represents a carbonyl group or a direct link, i.e., a bond;

each B independently represents O, NH or a direct link, i.e., a bond;

each $R_1$ independently represents H or $CH_3$;

each $R_2$ independently represents an alkyl, cyclic alkyl or alkoxy group having from 1 to about 10 carbon atoms or a direct link, i.e., a bond;

$R_3$ represents a substituted or unsubstituted pyridine ring;

$R_4$ represents a substituted or unsubstituted pyridinium ring;

$R_5$ represents a linear, branched or cyclic alkyl, alkoxy or aryl group having from 1 to about 24 carbon atoms;

X represents an anion or a mixture of anions, such as halide (e.g., chloride or bromide), alkylsulfate (e.g. methylsulfate), alkylsulfonate (e.g. methylsulfonate), or arylsulfonate (e.g. benzenesulfonate or toluenesulfonate);

Z represents at least one ethylenically unsaturated monomer;

a represents a mole % of from about 0 to about 98;

b represents a mole % of from about 5 to about 98; and c represents a mole % of from about 75 to about 2.

In a preferred embodiment of the invention, each $R_1$ represents H, each A, B and $R_2$ represents direct links, $R_3$ is pyridine and $R_4$ is pyridinium. In another preferred embodiment, $R_5$ is hydroxyethyl, a linear alkyl group having from about 12 to about 18 carbon atoms or benzyl.

As noted above, Z in the formula represents at least one ethylenically unsaturated, nonionic monomer. Examples of these include a styrene or an alpha-alkylstyrene, where the alkyl group has 1 to 4 carbon atoms and the aromatic group may be substituted or part of a larger ring system. Other examples of Z include acrylate esters derived from aliphatic alcohols or phenols; methacrylate esters; acrylamides; methacrylamides; N-vinylpyrrolidone or suitably substituted vinylpyrrolidones; vinyl esters derived from straight chain and branched acids, e.g., vinyl acetate; vinyl ethers, e.g., vinyl methyl ether; vinyl nitrites; vinyl ketones; halogen-containing monomers such as vinyl chloride; and olefins, such as butadiene. The ethylenically unsaturated, nonionic monomer may contain more than one polymerizable group. In a preferred embodiment, Z represents styrene.

Specific examples of the cationic, water-dispersible, partially quaternized pyridine-containing polymer useful in the invention include the following:

–(CH₂·CH)ₘ–(CH₂·CH)ₙ–(CH₂·CH)ₚ– with phenyl, pyridyl (N), and N+–CH₂CH₂OH Cl⁻ pyridinium substituents

| Polymer | m (mol %) | n (mol %) | p (mol %) |
|---------|-----------|-----------|-----------|
| P-1 | 45 | 42 | 13 |
| P-2 | 50 | 44 | 6 |
| P-3 | 50 | 38 | 12 |
| P-4 | 45 | 50 | 5 |
| P-5 | 45 | 45 | 10 |

The cationic, water-dispersible, partially quaternized pyridine-containing polymer employed in the invention may be used in an amount of from 0.2 to about 32 $g/m^2$, preferably from about 0.4 to about 16 $g/m^2$.

The polymers employed in this invention can be prepared using conventional polymerization techniques including, but not limited to bulk, solution, emulsion, or suspension polymerization. They also can be partially crosslinked.

A binder may also be employed in the image-receiving layer in the invention. In a preferred embodiment, the binder is a hydrophilic polymer. Examples of hydrophilic polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or poly(vinyl alcohol).

If a hydrophilic polymer is used in the image-receiving layer, it may be present in an amount of from about 0.02 to about 30 $g/m^2$, preferably from about 0.04 to about 16 $g/m^2$ of the image-receiving layer.

The weight ratio of cationic, water dispersible partially quaternized pyridine-containing polymer to binder is from about 1:99 to about 8:2, preferably from about 1:9 to about 4:6.

Latex polymer particles and/or inorganic oxide particles may also be used as the binder in the image-receiving layer to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof In that case, the weight % of particulates in the image receiving layer is from about 80 to about 95%, preferably from about 85 to about 90%.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt. %.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the process of the present invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, anti-oxidants, optical brighteners, and the like. A hardener may also be added to the ink-receiving layer if desired.

The support for the inkjet recording element used in the invention can be any of those usually used for inkjet receivers, such as paper, resin-coated paper, polyesters, or microporous materials such as polyethylene polymer-containing material sold by PPG Industries, Inc., Pittsburgh, Pennsylvania under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxally oriented support laminates. Biaxally oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxally oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

The support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount which is effective for the intended purpose. In general, good results are obtained when it is present in an amount of from about 2 to about 44 g/m$^2$, preferably from about 6 to about 32 g/m$^2$, which corresponds to a dry thickness of about 2 to about 40 $\mu$m, preferably about 6 to about 30 $\mu$m.

The following examples illustrates the utility of the present invention.

EXAMPLES

The following polymers were used as controls in the image-receiving layer:

CP-1: poly(styrene-co-4-vinylpyridine) (about 50:50 mole %) (U.S. Pat. No. 5,942,335)

CP-2: poly(N-vinylbenzyl-N,N,N-trimethylammonium chloride-co-divinylbenzene) (about 90/10 mole %) (U.S. Pat. No. 6,045,917)

Synthetic Preparation

Preparation of Poly(styrene-co-4-vinylpyridine-co-1-(2-hydroxyethyl)-4-vinylpyridinium Chloride) (P-1)

A 1-L 3-necked round-bottomed flask fitted with a mechanical stirrer, reflux condenser, and $N_2$ inlet was charged with 395 g of tetrahydrofuran, 74.6 g of styrene, and 74.4 g of 4-vinylpyridine. The solution was sparged with $N_2$ for approx. 15 min, 1.53 g of 2,2'azobisisobutryonitrile was added, and the solution was stirred and sparged an additional 15 min. The reaction mixture was heated at 60° C. with stirring under a slight positive pressure of $N_2$ for 18 hr, cooled, concentrated to approximately ½ the initial volume, and precipitated into a large excess of ether. The precipitate was dried in a vacuum oven at 35–40° C. overnight. The polymer was dissolved in methanol and reprecipitated into ether, filtered, and dried in vacuo.

To a 250-mL 3-necked round-bottomed flask fitted with a mechanical stirrer, reflux condenser, and $N_2$ inlet was added a solution of 20.0 g of the copolymer above in 80 g of dimethylfornamide. After the solution had been sparged with $N_2$ for 20 min, 3.84 g of 2-chloroethanol was added and the solution stirred and heated at 100° C. for 24 hr under a slight positive pressure of $N_2$. The clear, brown solution was precipitated into 1500 mL of ether and the precipitate dried at 35° C. in a vacuum oven overnight. Tg 135–136° C.

Example 1

Light Stability

Preparation of a Water Soluble, Anionic dye ink Composition, I-1

Ink I-1 containing Dye 1 identified above was prepared by mixing the dye concentrate (3.1%) with de-ionized water containing humectants of diethylene glycol (Aldrich Chemical Co.) and glycerol (Acros Co.), each at 6%, a biocide, Proxel GXL® biocide (Zeneca Specialties) at 0.003 wt %, and a surfactant, Surfynol 465® (Air Products Co.) at 0.05 wt. %.

The dye concentration was based on solution abs orption spectra and chosen such that the final ink when diluted 1:1000, would yield a transmission optical density of approximately 1.0.

Preparation of Control Ink Recording Elements C-1 and C-2

The composite side of a polyethylene resin-coated photographic grade paper based support was corona discharge treated prior to coating. ink receptive layers were composed of a mixture of 0.86 g/m$^2$ of polymer CP-1 or CP-2, 7.75 g/m$^2$ of pig skin gelatin and 0.09 g/m$^2$ of S-100 12 $\mu$m polystyrene beads (ACE Chemical Co.), and coated from distilled water on the above mentioned paper support.

Preparation of Invention Ink Recording Elements E-1 through B-5

Recording elements E-1 through B-5 of the invention were coated the same as described above, using P-1 through P-5 instead of CP-1 or CP-2.

Printing

Elements E-1 through E-5 and control elements C-1 and C-2 were printed using an Epson ® printer using I-1 ink described above. After printing, all images were allowed to dry at room temperature overnight, and the densities were measured at all steps using an X-Rite 820® densitometer. The images were then subjected to a high intensity daylight fading test for 2 weeks, 50Klux, 5400° K., approximately 25% RH. The Status A blue reflection density nearest to 1.0 was compared before and after fade and a percent density retained was calculated for the yellow dye with each receiver element. The results can be found in Table 1 below.

TABLE 1

| Recording Element | Polymer | Blue Density Before Fade | Blue Density After Fade | % Retained After Fade |
|---|---|---|---|---|
| E-1 | P-1 | 1.09 | 0.84 | 77 |
| E-2 | P-2 | 1.01 | 0.84 | 84 |
| E-3 | P-3 | 1.02 | 0.73 | 71 |
| E-4 | P-4 | 0.97 | 0.97 | 90 |
| E-5 | P-5 | 0.99 | 0.72 | 73 |
| C-1 | CP-1 | 1.0 | 0.88 | 88 |
| C-2 | CP-2 | 1.04 | 0.72 | 69 |

The above results show that the recording elements E-1 through E-5 of the invention, as compared to the control recording elements C-2, gave higher % retained density after high intensity daylight fading. Although control receiving element C-1 gave higher % retained densities than several of the recording elements of the invention, C-1 exhibits poor dye fixation as will be shown in Example 2 below.

Example 2

Waterfastness

Preparation of a Water Soluble, Anionic Dye Ink Composition, I-2

Ink I-2 was prepared as described in Example 1 except Dye 2 (0.58%) was added in place of Dye 1.

Printing

Elements E-1 and E-5 and control elements C-1 through C-2 were printed as described in Example 1 except I-2 was used instead of I-1. After printing, all images were allowed to dry at room temperature overnight.

The images were then subjected to a waterfastness test (WF) which involves soaking each imaged receiver in room temperature, distilled water for 5 minutes and then allowing the image to dry at room temperature overnight. The image quality of each print was then visually ranked and assigned a value between 0 and 5. The visual ranking is an indirect measure of how well the dye is fixed (dye fixation) to the receiver layer. Zero represents no image degradation (better dye fixation) and 5 represents severe image degradation (poor dye fixation) and the results are summarized in Table 2 below.

TABLE 2

| Recording Element | Polymer | WF Rank |
|---|---|---|
| E-1 | P-1 | 2 |
| E-2 | P-2 | 3 |
| E-3 | P-3 | 2 |
| E-4 | P-4 | 3 |
| E-5 | P-5 | 2 |

TABLE 2-continued

| Recording Element | Polymer | WF Rank |
|---|---|---|
| C-1 | CP-1 | 4 |
| C-2 | CP-2 | 1 |

The above results show that the recording elements E-1 through E-5 of the invention, as compared to the control recording element C-1, gave better dye fixation after the waterfastness test. Although control receiver element C-2 gave better dye fixation than the recording elements of the invention, the light stability was worse as illustrated in Example 1 above.

Example 3

Light Stability Using Particulates

Preparation of Control Ink Recording Element C-3

Control recording element C-3 was prepared the same as C-2 in Example 1 except the ink receptive layer was composed of two layers. The bottom layer was composed of a mixture of 37.9 g/m$^2$ of fumed alumina (Cabot Corp.), 4.3 g/m$^2$ of GH-23 ® poly(vinyl alcohol) (Nippon Gohsei); 0.9 g/m$^2$ of dihydroxydioxane (Clariant) hardener, and 0.04 g.m$^2$ of Olin 10G ® (Olin Co.) surfactant coated from distilled water.

On top of the above layer was then coated a mixture of 2.68 g/m$^2$ of fumed alumina, 0.06 g/m$^2$ of GH-23 poly(vinyl alcohol), and 0.48 g/m$^2$ of CP-2 coated from distilled water.

Preparation of Invention Ink Recording Element E-6

Recording element E-6 of the invention was coated the same as described for control receiver element C-3, except P-2 was used in place of CP-2.

Printing:

The recording element E-6 of the invention and control recording element C-3 were printed and evaluated as described in Example 1 above and the results are summarized in Table 3 below.

TABLE 3

| Recording Element | Polymer | Blue Density Before Fade | Blue Density After Fade | % Retained After Fade |
|---|---|---|---|---|
| E-6 | P-2 | 1.08 | 0.57 | 53 |
| C-3 | CP-2 | 0.98 | 0.31 | 31 |

The above results show that the recording element E-6 of the invention, as compared to the control recording element C-3, gave higher % retained density after high intensity daylight fading.

The invention has been described in detail with particular reference to certain preferred embodiments thereof, but it will be understood that variations and modifications can be effected within the spirit and scope of the invention.

What is claimed is:

1. An ink jet printing method, comprising the steps of:
    A) providing an ink jet printer that is responsive to digital data signals;
    B) loading the printer with ink-receptive elements comprising a support having thereon an image-receiving layer comprising a cationic, water-dispersible, partially quaternized pyridine-containing polymer;

C) loading said printer with an ink jet ink composition comprising water, a humectant, and a water-soluble anionic dye; and D) printing on said image-receiving layer using said ink jet ink in response to said digital data signals.

2. The method of claim 1 wherein said cationic, water-dispersible, partially quaternized pyridine-containing polymer has the formula:

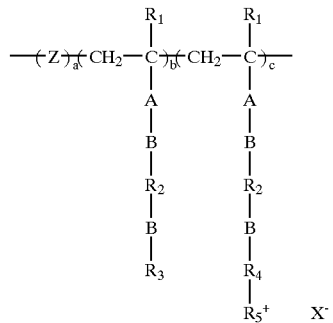

wherein:
- each A independently represents a carbonyl group or a direct link;
- each B independently represents O, NH or a direct link;
- each $R_1$ independently represents H or $CH_3$;
- each $R_2$ independently represents an alkyl, cyclic alkyl or alkoxy group having from 1 to about 10 carbon atoms or a direct link;
- $R_3$ represents a substituted or unsubstituted pyridine ring;
- $R_4$ represents a substituted or unsubstituted pyridinium ring;
- $R_5$ represents a linear, branched or cyclic alkyl, alkoxy or aryl group having from 1 to about 24 carbon atoms;
- X represents an anion or a mixture of anions;
- Z represents at least one ethylenically unsaturated monomer;
- a represents a mole % of from about 0 to about 98;
- b represents a mole % of from about 5 to about 98; and
- c represents a mole % of from about 75 to about 2.

3. The method of claim 2 wherein each $R_1$ represents H, each A, B and $R_2$ represents direct links, $R_3$ is pyridine and $R_4$ is pyridinium.

4. The method of claim 2 wherein Z is a styrenic monomer, an acrylate ester, a methacrylate ester, an acrylamide, a methacrylamide, a vinylpyrrolidone, a vinyl ester derived from straight chain and branched acids, a vinyl ether, a vinyl nitrile, a vinyl ketone, a halogen-containing monomer or an olefm.

5. The method of claim 2 wherein Z is styrene.

6. The method of claim 2 wherein $R_5$ is hydroxyethyl, a linear alkyl group having from about 12 to about 18 carbon atoms or benzyl.

7. The method of claim 2 wherein X is chloride.

8. The method of claim 1 wherein said humectant is diethylene glycol, glycerol or diethylene glycol monobutylether.

9. The method of claim 1 wherein said image-receiving layer also contains a binder.

10. The method of claim 9 wherein said binder is a hydrophilic polymer.

11. The method of claim 10 wherein said hydrophilic polymer is gelatin or poly(vinyl alcohol).

12. The method of claim 1 wherein said image-receiving layer contains particulates.

13. The method of claim 12 wherein said particulates are inorganic oxides or organic latex polymers.

14. The method of claim 12 wherein said particulates are barium sulfate, calcium carbonate, clay, silica or alumina.

15. The method of claim 1 wherein said anionic dye comprises about 0.2 to about 5% by weight of said ink jet ink composition.

* * * * *